United States Patent [19]
Morrison et al.

[11] 4,273,004
[45] Jun. 16, 1981

[54] GEAR SELECTOR MECHANISM

[76] Inventors: William M. Morrison, Shandon, 107 Coalway Rd., Wolverhampton, West Midland, England; Philip J. Mazziotti, 2826 Falmouth Rd., Toledo, Ohio 43615

[21] Appl. No.: 60,117

[22] Filed: Jul. 23, 1979

[30] Foreign Application Priority Data

Jul. 25, 1978 [GB] United Kingdom ............... 31079/78

[51] Int. Cl.³ ............................................. G05G 9/14
[52] U.S. Cl. .................................... 74/473 R; 74/475
[58] Field of Search ................. 74/473 R, 473 P, 475, 74/476, 477

[56] References Cited

U.S. PATENT DOCUMENTS

| | | | |
|---|---|---|---|
| 2,680,657 | 6/1954 | Drozynski | 74/473 R X |
| 3,274,842 | 9/1966 | Huff | 74/473 R X |
| 3,387,501 | 6/1968 | Frost | 74/473 R X |
| 3,857,299 | 12/1974 | Morrison | 74/473 R |
| 3,943,792 | 3/1976 | Sibeud | 74/473 R |
| 4,170,148 | 10/1979 | Wolfe | 74/473 R X |

*Primary Examiner*—Allan D. Herrmann
*Attorney, Agent, or Firm*—Robert M. Leonardi

[57] ABSTRACT

A selector mechanism for a gearbox in which gear shaft elements 68 are mounted on respective bars 52, 53, 54 which can move parallel with one another and only in these directions, an external control 45 being provided to selectively engage and move the bars 52, 53, 54.

7 Claims, 9 Drawing Figures

GEAR SELECTOR MECHANISM

This invention relates to gear selector mechanisms for use in manually controlled gearboxes.

Selector mechanisms must operate with minimum of applied external effort which may be manually or otherwise applied, but must also occupy a minimum of space within a gearbox. The space requirement is particularly significant if the gearbox is to be capable of fitment into a number of different types of motor vehicle, in which for example, the position of an external manual control lever varies from vehicle to vehicle and in which the positions of adjacent mechanisms and other vehicle components may also vary from one type of vehicle to another.

It is the object of this invention to provide a selector mechanism for a gearbox which is simple efficient and compact.

According to the invention, there is provided a selector mechanism for a gear box in which gear shift elements are respectively connected to two or more bars which are constrained to move substantially only in the direction of their lengths and an external control member arranged selectively to engage the bars to move them in such lengthwise manner.

Conveniently, the external control member is arranged to enter the top of the gearbox to engage the bars, which are arranged in the top of said gearbox.

Alternatively, the manual control member includes a rod journalled in the gearbox to extend transversely to the lengths of the bars and engages them by means of a lateral projection on said rod, the rod serving as said external members.

The invention will now be described, by way of example, with reference to the accompanying drawings, in which.

Figure 1:
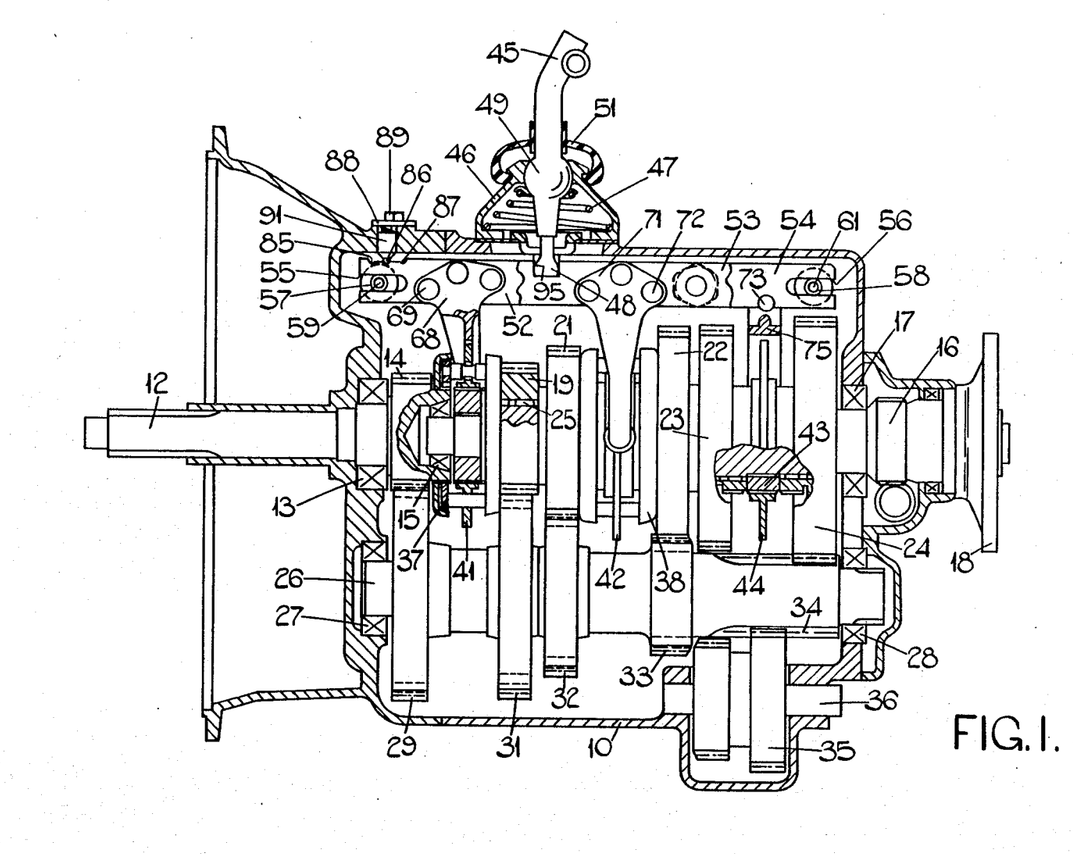
FIG. 1 is a cross-sectional side elevation view of a gearbox incorporating a gear selector mechanism constructed in accordance with the invention.

Referring first to FIG. 1, there is shown a manually operable vehicle gearbox which in this example has five forward speeds and one reverse.

The gearbox includes a multi-part casing indicated generally at 10, with a bell housing 11 at one end for containing a clutch and for connection to an engine in conventional manner. Through the bell housing extends an input shaft 12 splined at its outer end and journalled in the gearbox casing in taper roller bearings 13. The input shaft extends a short distance into the interior of the casing 10 and has an integral gear 14 at that end. Within that gear 14 is a concentric recess to receive a taper roller bearing 15 journalling one end of a long output shaft coaxial with the input shaft and extending out of the gearbox casing 10 at the end remote from the bell housing 11. The long output shaft 16 therefore extends through most of the length of the gearbox and is journalled at the output end by means of a further taper roller bearing 17. The external end of the output shaft is flanged at 18.

The output shaft carries a number of gears 19, 21, 22, 23, and 24. All these gears are mounted for rotation on the output shaft by means of respective needle roller bearings 25.

Mounted below and in parallel with the co-axial input and output shafts 12 and 16 is a lay shaft 26. This is mounted in respective taper roller bearings 27, 28 in opposite ends of the casing 10, respectively. The end of the layshaft 26 adjacent to the bell housing 11 has three gears 29, 31, 32 keyed, and thus non-rotatably connected to it. These mesh respectively with the gears 14 on the input shaft 12 and with the gears 19 and 21 on the output shaft. The lay shaft has an integral gear 33 in mesh with the gear wheel 22 on the output shaft and a further elongated gear 34 with which the gear 24 on the output shaft meshes. Also meshing with the elongated gear 34 of the lay shaft 26 is a member 35 mounted on a short shaft 36 parallel with and below the lay shaft 26. The member 35 has two gear portions, one of which engages the elongated gear 34 whereas the other portion engages a gear wheel (not illustrated) which, in turn, meshes with the gear 23 on the output shaft 16.

the arrangement of gears illustrated is by way of example only and this is a conventionally arranged gearbox. It is to be understood that gearboxes of other configuration may be used is combination with the features of the selector mechanism to be described.

Certain of the gears are selected by double-sided synchronisers and two of these are shown at 37 and 38. The synchroniser 37 is capable of connecting the input shaft directly with the output shaft or alternatively, the gear 19 to the output shaft. The synchroniser 38, moreover, provides for connection of the gear 21 to the output shaft or alternatively, the gear 22 to the output shaft. The synchronisers each have central slidable members 41, 42, to which further reference will be made, but which are movable in either of two direction to accomplish the appropriate engagement referred to.

For engagement of either of the gears 23 or 24 with the output shaft 16, there is a dog-clutch mechanism indicated generally at 43, having a central slidable member 44 which is capable of movement in either of two opposite directions to engage teeth thereon with teeth carried on extensions of the gears 23 and 24 respectively. The synchronisers 37, 38 and the dog-clutch mechanism 43 are of conventional kind and it is to be understood that alternative gear selecting means may be provided within the gearbox for use with the selector mechanism.

In use, the input shaft of the gearbox is rotated by the associated prime mover and the gear 14 thereon is always in driving engagement with the gear 29 carried on the lay shaft 26. The lay shaft is, therefore, continuously in motion and drives all the gears 19, 21, 22 and 24. Selection of engagement of any one of these gears with the output shaft 16 causes that shaft to be rotated at an appropriate speed. Furthermore, the further alternative arrangement in which the input shaft and output shaft are connected together by the synchronisers 37 allows direct drive from the input shaft to the output shaft to take place.

Reverse gear is selected by locking the gear 23 to the output shaft, whereupon the member 35 will transmit drive from the lay shaft to that gear 23 and thence to the output shaft.

The selector mechanism is shown at the top of the gearbox, from which extends a manual control lever indicated at 45. This is mounted in a collar 46 secured to the top of the casing 10 and containing a conical spring 47. The lever 45, at its lower end, within the gearbox, terminates in a part spherical integral portion 48 and within the collar 46 the lever 45 has a larger part spherical portion 49. This is journalled in the collar to allow rotary movement of the lever and it is constrained by means of the spring 47. The narrower end of the spring bears on the part spherical portion 49 of the lever. A gaiter 51 forms a seal around the upper part of the collar 46.

Figure 2:
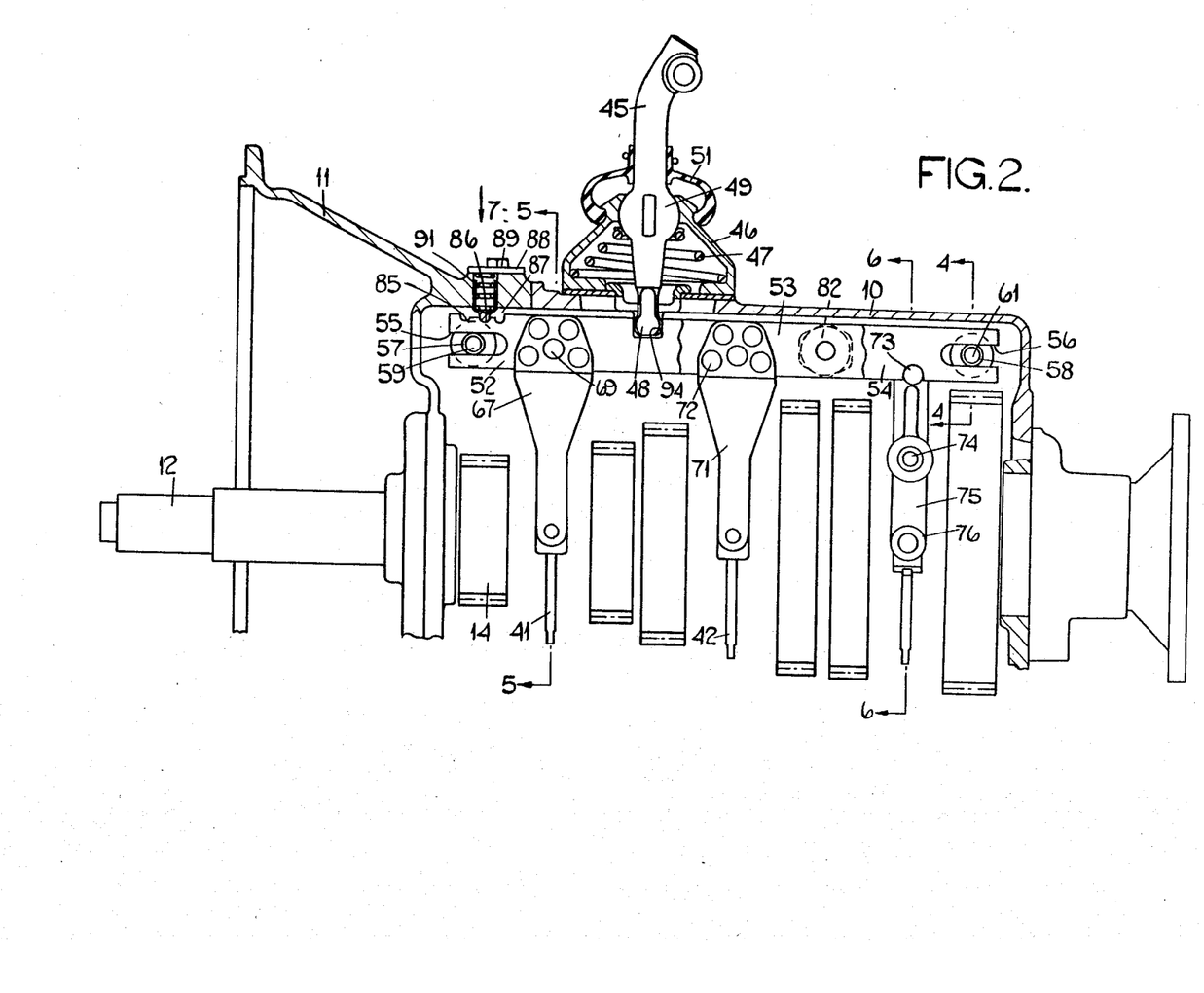
FIG. 2 is a fragmentary side elevation view of the same gearbox.
Figure 3:
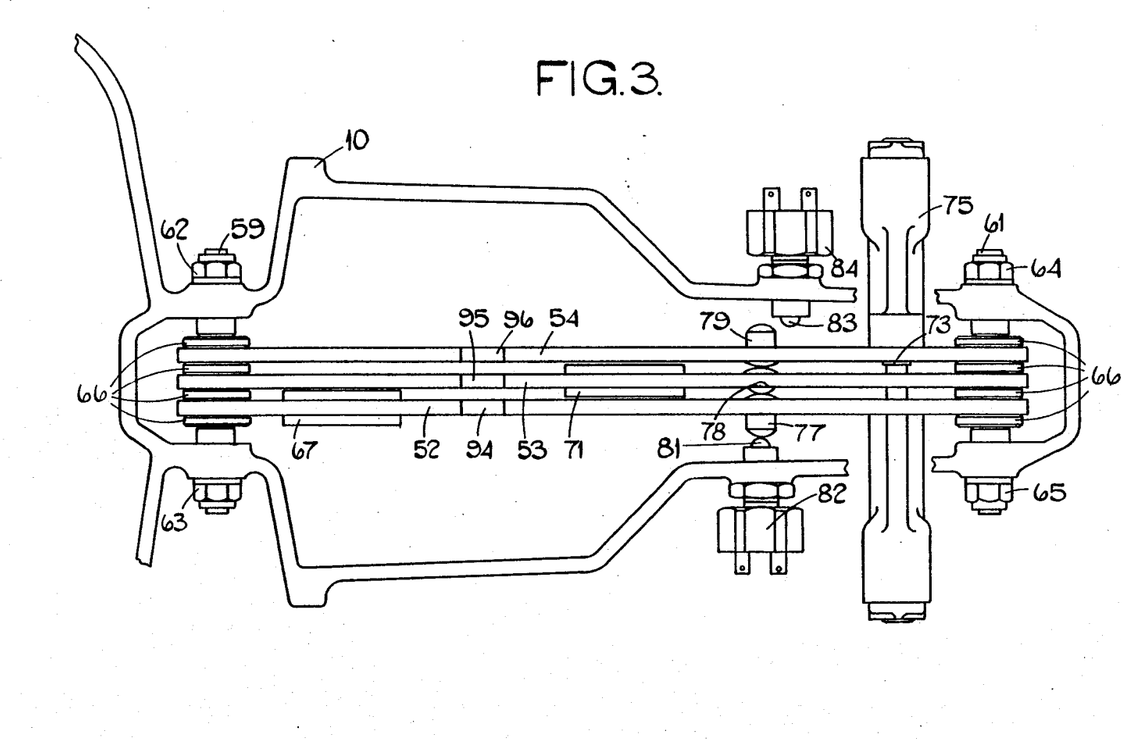
FIG. 3 is a plan view of the selector mechanism.
Figure 4:
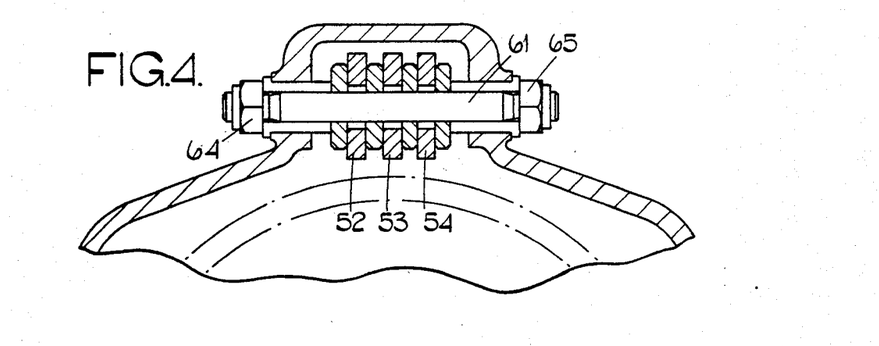
FIG. 4 is a cross-sectional view on the line 4—4 in FIG. 2.

Within the top of the gearbox are mounted three parallel flat rectangular section bars 52, 43, 54. These bars are mounted on edge and extend lengthwise of the gearbox, that is parallel with the co-axial input and outout shafts and in this example they are mounted centrally above such shafts. The bars 52, 53, 54 are constrained for movement only in the direction of their lengths and they are slotted at their ends to provide for such movement. The slots 55, 56 which are shown in the bar 52 in FIGS. 1 and 2 are carried on rollers 57, 58 which are, in turn, mounted on bolts 59, 61 fixed in the casing 10 by nuts 62, 63, 64, 65 as shown in FIG. 3 and FIG. 4. To space the bars 52, 53, 54 apart, the bolts 59, 61 also carry spacer discs 66.

Figure 5:
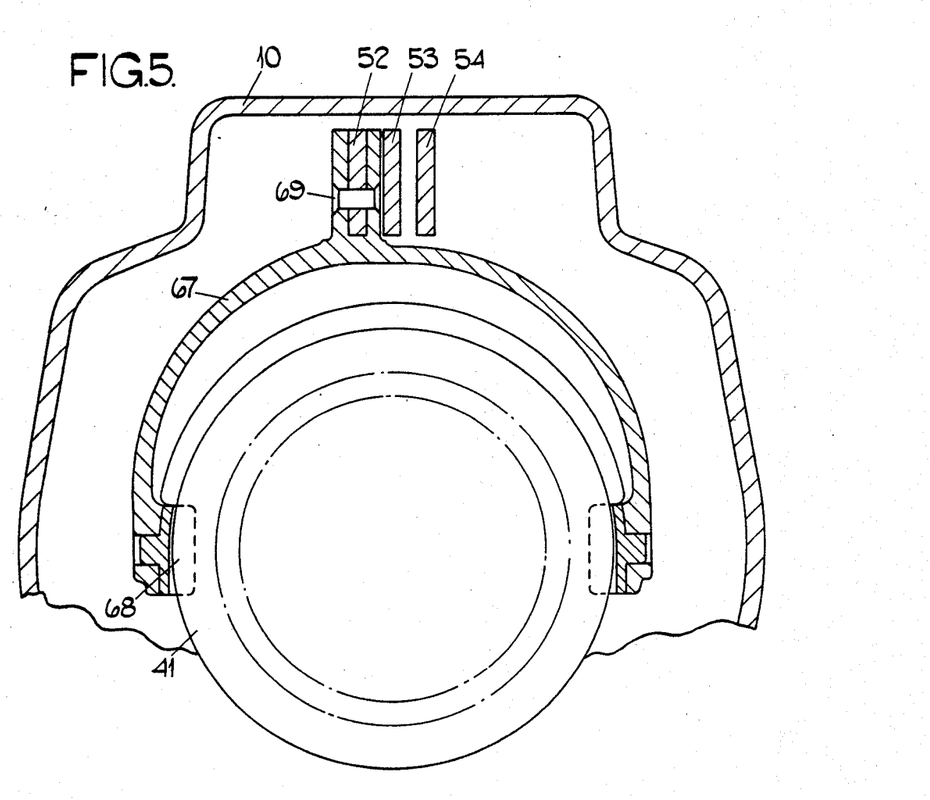
FIG. 5 is a cross-sectional view on the line 5—5 in FIG. 2.

To the bar 52 there is secured a selector fork 67 which is also shown in FIG. 5. This engages the slidable member 41 of the synchroniser 37. The ends of the selector fork 67, as shown in FIG. 5, engage this member 41 through shoes 68. The selector fork 67 is secured to the bar 52 by rivets 69. The shapes of the selector forks 67 shown in FIGS. 1 and 2 differ slightly but the principles are the same.

The bar 53 carries a further selector fork 71 which engages the slidable member 42 of the synchroniser 38.

In the underneath surface of the bar 54 a particular cut out is provided to accept a pin 73. This pin is carried on one end of a forked lever 75, also shown in FIG. 6, pivoted in the casing on pins 74. Pivoted in turn upon the ends of the forks of the lever 75 are shoes 76 which engage the slidable member 44 of the dog-clutch mechanism 43. This arrangement provides for pivoting of the forked member 75 about the pins 74 when the bar 54 is moved linearly.

As shown in particular in FIG. 3, the bars 52, 53, 54 carry respective short pins 77, 78, 79. In the position shown in that view, these are all in alignment and they also align with a plunger 81 a switch 82 mounted in the casing 10. When in the position shown, with the plunger 81 depressed, the switch 82 is actuated to illuminate a light visible to the vehicle driver, indicating that the gearbox is in neutral position. If, however, any one of the pins is out of such alignment the light will not be illuminated. A small amount of lateral deflection is allowed, to accomplish this.

If the bar 54 is displaced rearwardly, or to the right as shown in FIG. 3, until its pin 79 engages a plunger 83 of a further switch 85, a circuit connected to another light visible to the vehicle driver is actuated. Displacement of the bar 54 in that direction accomplishes engagement of reverse gear within the gearbox and such light indicates that reverse gear has been selected. This may also be used to illuminate a reversing lamp on the vehicle.

Figures 6, 7:
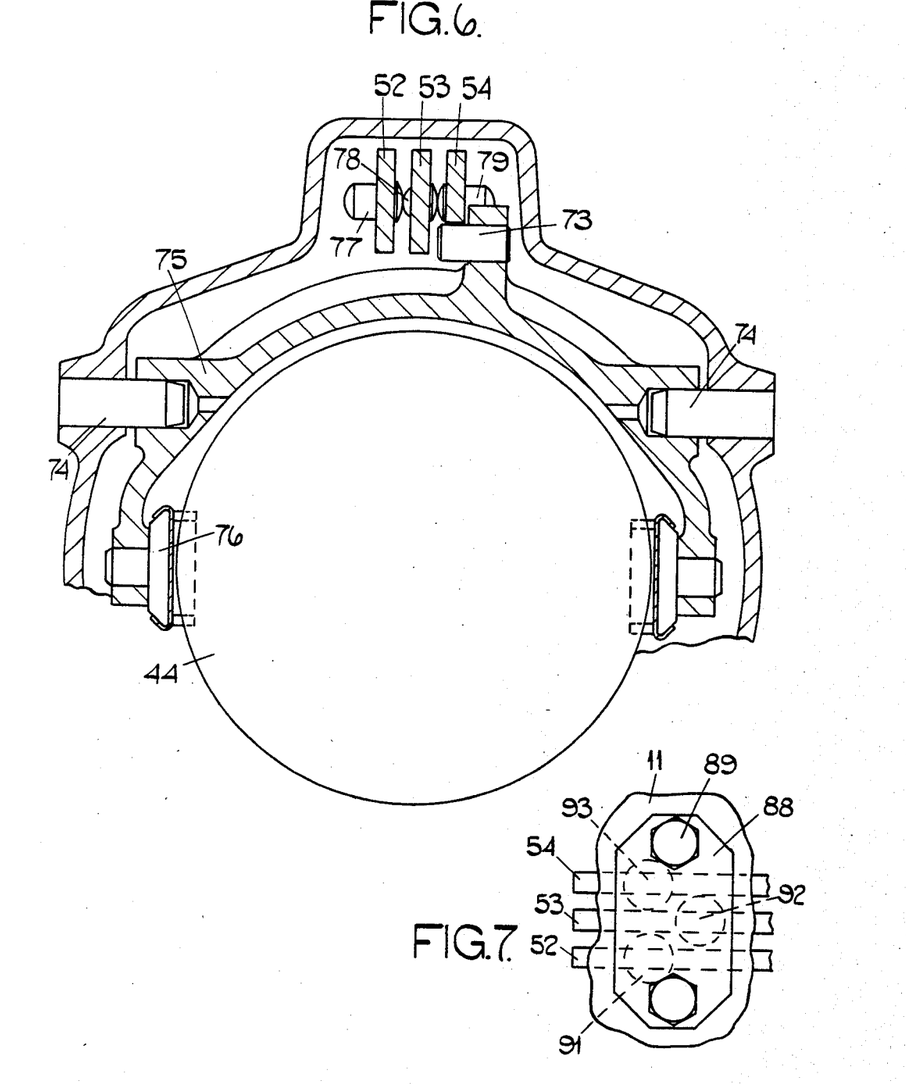
FIG. 6 is a cross-sectional view on the line 6—6 in FIG. 2.
FIG. 7 is a fragmentary view in the direction of arrow 7 in FIG. 2.

At the forward end of each of the bars 52, 53, 54 there are triple detents, those on the bar 52 being indicated at 85, 86, 87 in FIGS. 1 and 2 respectively. A plate 88 secured by bolts 89 into the top of the casing 10 carries three spring loaded plungers 91, 92, 93, the relative staggered positions of which are shown in FIG. 7. Linear movement of the bars 52, 53 or 54 are thus resisted by the plunger entering the respective detents but the shapes of the plungers are such that they may be forced to retract to allow the bars to move but the springs will tend to hold the bars in positions selected.

To move the bars linearly, the manual lever 45 is moved in a fore and aft direction but lateral accompanying movement transfers the part spherical end portion of the lever 45 between respective alignment with the bars 52, 53 and 54. Each bar is provided with a cut out into which the portion 48 will engage. These cut outs are identified at 94, 95, 96 in FIG. 3.

Figure 8:
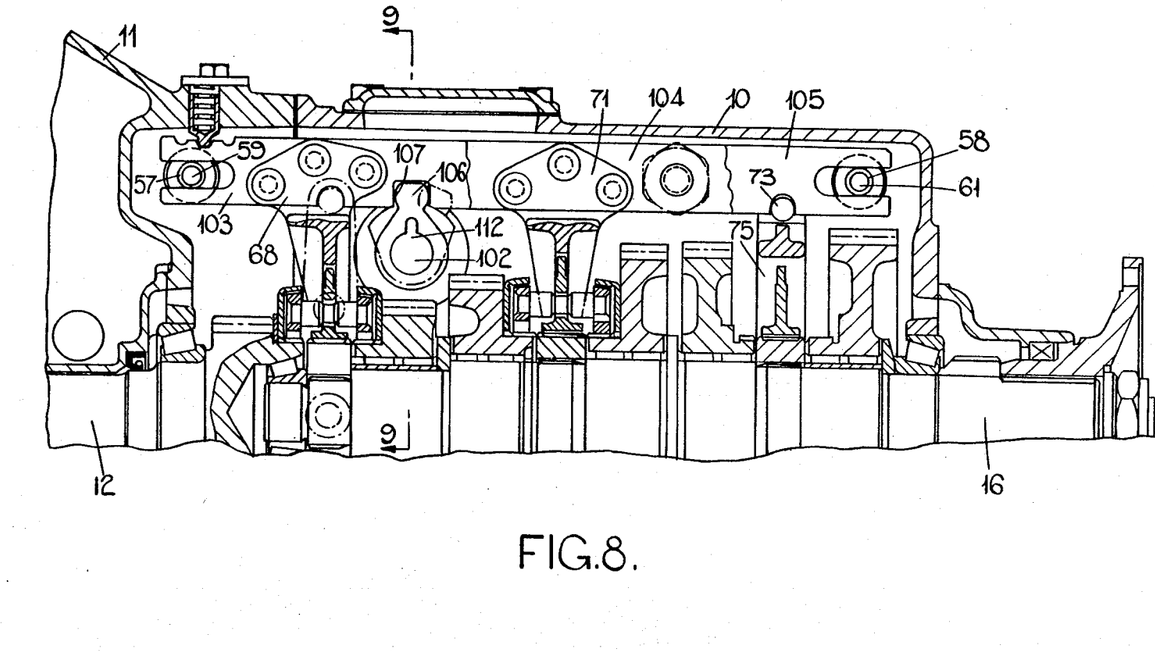
FIG. 8 is a cross-sectional side elevation view of a gearbox with an alternative form of selector mechanism constructed in accordance with the invention.
Figure 9:
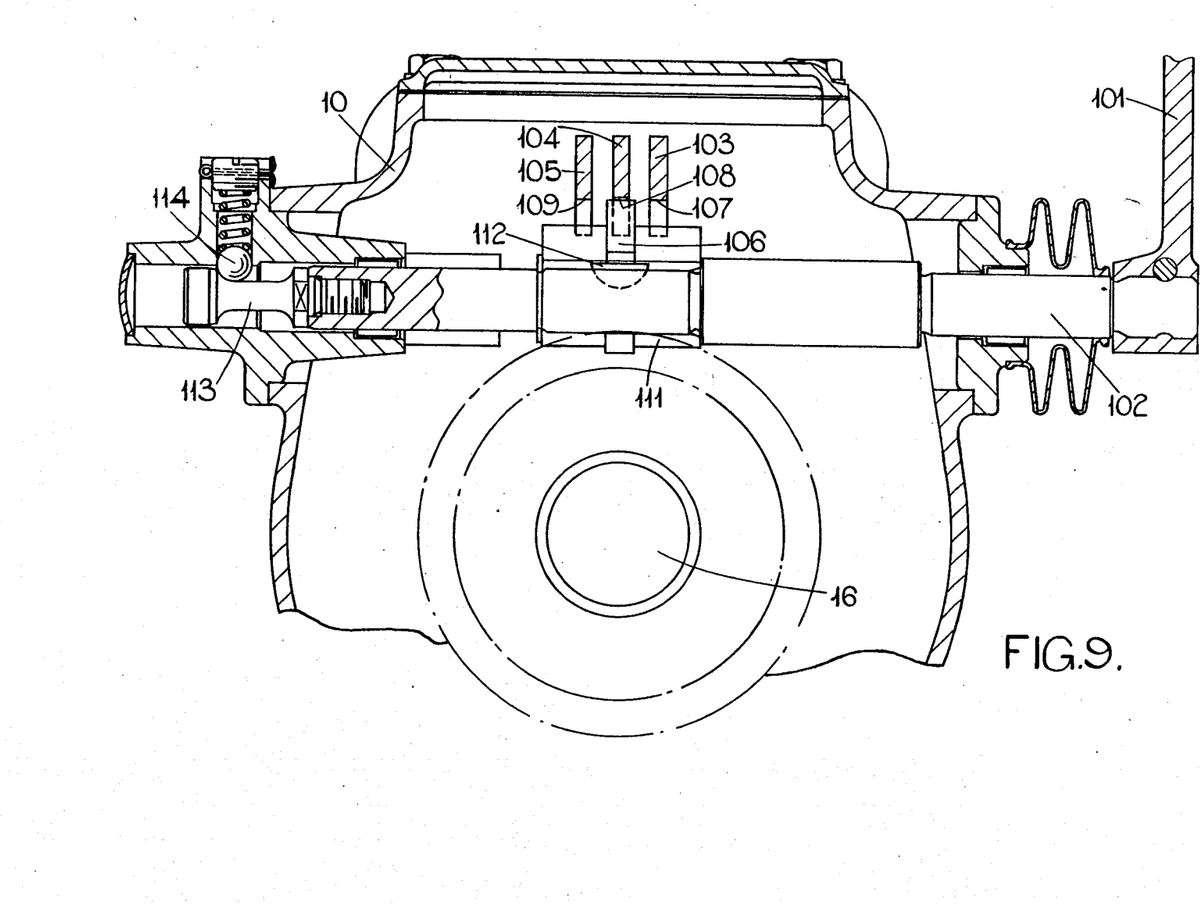
FIG. 9 is a cross-sectional view on the line 9—9 in FIG. 8.

The alternative construction shown in FIGS. 8 and 9 shows a selector mechanism applied to the same gearbox as that previously described. The equivalent parts are, therefore, identified by the same numerals. The manual selection is, however, not by means of the central upstanding control lever 45 but by means of an external lever 101 shown in FIG. 9. This is capable of both rotary and transverse movement, that is in the direction of the width of the gearbox. The lever 101 is secured to one end of a rod 102 extending out of the side of the upper part of the gearbox casing 10. The rod 102 extends across the width of the casing below the three bars which are the equivalents of the bars 52, 53, 54 in the previously described construction. These bars are, however, identified by numerals 103, 104 and 105 respectively. They are slotted at their ends and mounted upon bolts which are the same as those in the construction previously described and these elements are, therefore, identified by the same numerals. The bars 103, 104 are furthermore provided with respective selector forks 68 and 71 and the bar 105 engages a pin 73 on the forked member 75.

As previously referred to the rod 102 passed beneath the bars 103, 104, 105 and it carries in its mid region a projection 106 engaging in cut outs 107, 108, 109 in the bars 103, 104, 105 respectively. The projection 106 is part of a sleeve 111 carried on the rod 102 and secured by a key 112.

At the end of the rod 102 remote from the lever 101 secured thereto, the rod has a screw-threaded socket to accept a co-axial spool 113. Engaging the narrower centre portion of this spool is a spring loaded ball 114 mounted in an extension of the casing 10. This provides a baulk device for resisting travel of the rod 102 lengthwise thereof in the two opposite directions so that the operator may feel the resistance offered by the baulk device, to identify the position of the projection 106 with respect to the three bars 103, 104, 105.

Lateral and linear movement of the rod 102 therefore provides for selection of the gears in a manner similar to that in the other construction referred to. This arrangement provides a low gearbox height which may be desirable in some applications.

Direct lever control by manual means may be provided as illustrated in either of the two versions but, as an alternative, intermediate linkages may be provided to enable remote gear selection to take place. Furthermore, certain pre-selection or automaic selector devices may be used to actuate the selector mechanism described.

We claim:

1. A gearbox having an output shaft and an axis parallel to said output shaft, said gearbox comprising a main housing for enclosing gears and a bell housing for positioning adjacent an associated clutch, said bell housing secured to said main housing, first roller mounting means located in said main housing, second roller mounting means located in said bell housing, a first set of rollers mounted on said first roller mounting means, a second set of rollers mounted on said second roller mounting means, a plurality of shift bars operatively connected to shift elements for engaging and disengaging said gears, each of said shift bars extending parallel to said axis, each of said shift bars having a rectangular cross-section and having first and second axially spaced ends, said first ends of each of said shift bars mounted on said first set of rollers, said second ends of each of said shift bars mounted on said second set of rollers, at least one of said first and second ends of each of said shift bars defining a slot to facilitate the assembly of said gearbox, said bars being constrained to substantially axial movement by said first and second sets of rollers, and control means for selectively engaging and axially moving shift bars.

2. A selector mechanism as claimed in claim 1 in which the external control member is arranged to enter the top of a casing of the gearbox, and is journalled therein, the control member having an element engageable with said bars selectively, said bars being situtated near the top of said casing.

3. A selector mechanism as claimed in claim 1 in which the external control member is connected to a rod extending transversely of the length of the gearbox and being capable of rotary and linear movement, said rod carrying a member alternatively engageable with said bars, linear movement of the rod being for aligning the member with a selected one of said bars and rotary movement being to move the selected bar linearly.

4. A selector mechanism as claimed in claim 3 in which the rod has means for resisting linear movement thereof.

5. A selector mechanism as claimed in claim 1 in which the bars carry means for actuating at least one switch connected in an electrical circuit.

6. a selector mechanism as claimed in claim 1 in which spring loaded means for releasably resisting movement of the bars in their lengthwise directions are provided.

7. A gearbox as defined in claim 1 wherein each of said first and second ends of each of said plurality of shift bars defines a slot to facilitate the assembly of said gearbox.

* * * * *